United States Patent
Devadhar

(10) Patent No.: US 8,793,691 B2
(45) Date of Patent: Jul. 29, 2014

(54) MANAGING AND FORWARDING TASKS TO HANDLER FOR PROCESSING USING A MESSAGE QUEUE

(75) Inventor: Vijayanth Devadhar, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 591 days.

(21) Appl. No.: 13/088,291

(22) Filed: Apr. 15, 2011

(65) Prior Publication Data

US 2011/0258628 A1 Oct. 20, 2011

Related U.S. Application Data

(60) Provisional application No. 61/324,699, filed on Apr. 15, 2010.

(51) Int. Cl.
| G06F 15/16 | (2006.01) |
| G06F 17/30 | (2006.01) |
| G06F 9/46 | (2006.01) |
| G06F 9/54 | (2006.01) |

(52) U.S. Cl.
USPC .... 718/100; 719/313; 719/314; 707/E17.001; 707/E17.005

(58) Field of Classification Search
None
See application file for complete search history.

(56) References Cited

U.S. PATENT DOCUMENTS

| 5,577,188 A | 11/1996 | Zhu et al. |
| 5,608,872 A | 3/1997 | Schwartz et al. |
| 5,649,104 A | 7/1997 | Carleton et al. |
| 5,715,450 A | 2/1998 | Ambrose et al. |
| 5,734,903 A * | 3/1998 | Saulpaugh et al. ........... 719/316 |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,058,389 A * | 5/2000 | Chandra et al. ........................ 1/1 |
| 6,092,083 A | 7/2000 | Brodersen et al. |
| 6,108,646 A * | 8/2000 | Mohri et al. ........................... 1/1 |
| 6,138,168 A * | 10/2000 | Kelly et al. ................... 719/310 |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,185,613 B1 * | 2/2001 | Lawson et al. ................. 709/224 |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |

(Continued)

OTHER PUBLICATIONS

U.S. Appl. No. 60/828,192, filed Oct. 4, 2006.

*Primary Examiner* — Meng An
*Assistant Examiner* — Benjamin Wu
(74) *Attorney, Agent, or Firm* — Zilka-Kotab, PC

(57) ABSTRACT

In accordance with embodiments, there are provided mechanisms and methods for transporting a task to a handler, utilizing a queue. These mechanisms and methods for transporting a task to a handler, utilizing a queue can enable improved task management, increased efficiency, dynamic task processing, etc.

22 Claims, 4 Drawing Sheets

(56) References Cited

U.S. PATENT DOCUMENTS

| | | | |
|---|---|---|---|
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,181,758 B1 | 2/2007 | Chan | |
| 7,209,929 B2 | 4/2007 | Dominguez, Jr. et al. | |
| 7,289,988 B2* | 10/2007 | Joseph | 1/1 |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,680,848 B2* | 3/2010 | Janedittakarn et al. | 707/613 |
| 7,698,160 B2 | 4/2010 | Beaven et al. | |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,196,150 B2* | 6/2012 | Downing et al. | 719/314 |
| 8,275,836 B2 | 9/2012 | Beaven et al. | |
| 8,443,366 B1* | 5/2013 | Yancey | 718/102 |
| 8,457,545 B2 | 6/2013 | Chan | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0158883 A1* | 8/2003 | Drudis et al. | 709/102 |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0205770 A1* | 10/2004 | Zhang et al. | 719/313 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0223022 A1 | 10/2005 | Weissman et al. | |
| 2005/0283478 A1 | 12/2005 | Choi et al. | |
| 2006/0206834 A1 | 9/2006 | Fisher et al. | |
| 2006/0294058 A1* | 12/2006 | Zabback et al. | 707/2 |
| 2007/0100951 A1* | 5/2007 | Bae | 709/206 |
| 2007/0204275 A1* | 8/2007 | Alshab et al. | 719/313 |
| 2008/0082586 A1* | 4/2008 | Jasik et al. | 707/200 |
| 2008/0243867 A1* | 10/2008 | Janedittakarn et al. | 707/10 |
| 2008/0249972 A1 | 10/2008 | Dillon | |
| 2008/0270628 A1* | 10/2008 | Nekovee et al. | 709/247 |
| 2008/0301175 A1* | 12/2008 | Applebaum et al. | 707/102 |
| 2009/0030906 A1* | 1/2009 | Doshi et al. | 707/9 |
| 2009/0063415 A1 | 3/2009 | Chatfield et al. | |
| 2009/0070336 A1* | 3/2009 | Wiechers et al. | 707/10 |
| 2009/0300018 A1* | 12/2009 | Todd | 707/8 |
| 2012/0066694 A1* | 3/2012 | Jennings et al. | 719/318 |
| 2013/0013577 A1* | 1/2013 | Fee et al. | 707/703 |
| 2013/0246356 A1* | 9/2013 | Taylor et al. | 707/629 |

* cited by examiner

MANAGING AND FORWARDING TASKS TO HANDLER FOR PROCESSING USING A MESSAGE QUEUE

CLAIM OF PRIORITY

This application claims the benefit of U.S. Provisional Patent Application 61/324,699, entitled "Methods and systems for servicing a messaging queue in an on-demand service environment," by Vijayanth Devadhar, filed Apr. 15, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to task handling, and more particularly to handling tasks utilizing a queue.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Conventional systems may desire a queue framework to manage tasks within the system. For example, a queue framework may prevent users from having to wait until their submitted tasks have completed within the system, and may assist in managing tasks initiated from within the system. Unfortunately, current queue frameworks have been associated with various limitations.

Just by way of example, current standalone queue frameworks may be built to address a specific system task, and may not apply to other tasks within the system. Additionally, current queue frameworks may include bugs as well as control and prioritization issues, among other problems. Accordingly, it is desirable to optimize the management of tasks, utilizing a queue.

BRIEF SUMMARY

In accordance with embodiments, there are provided mechanisms and methods for transporting a task to a handler, utilizing a queue. These mechanisms and methods for transporting a task to a handler, utilizing a queue can enable improved task management, increased efficiency, dynamic task processing, etc.

In an embodiment and by way of example, a method for transporting a task to a handler, utilizing a queue is provided. In one embodiment, a task is received at a system. Additionally, the task is inserted into a message queue of the system. Further, the task is transported to a handler, utilizing the message queue.

While one or more implementations and techniques are described with reference to an embodiment in which transporting a task to a handler, utilizing a queue is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for transporting a task to a handler, utilizing a queue.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for transporting a task to a handler, utilizing a queue will be described with reference to example embodiments.

Figure 1:
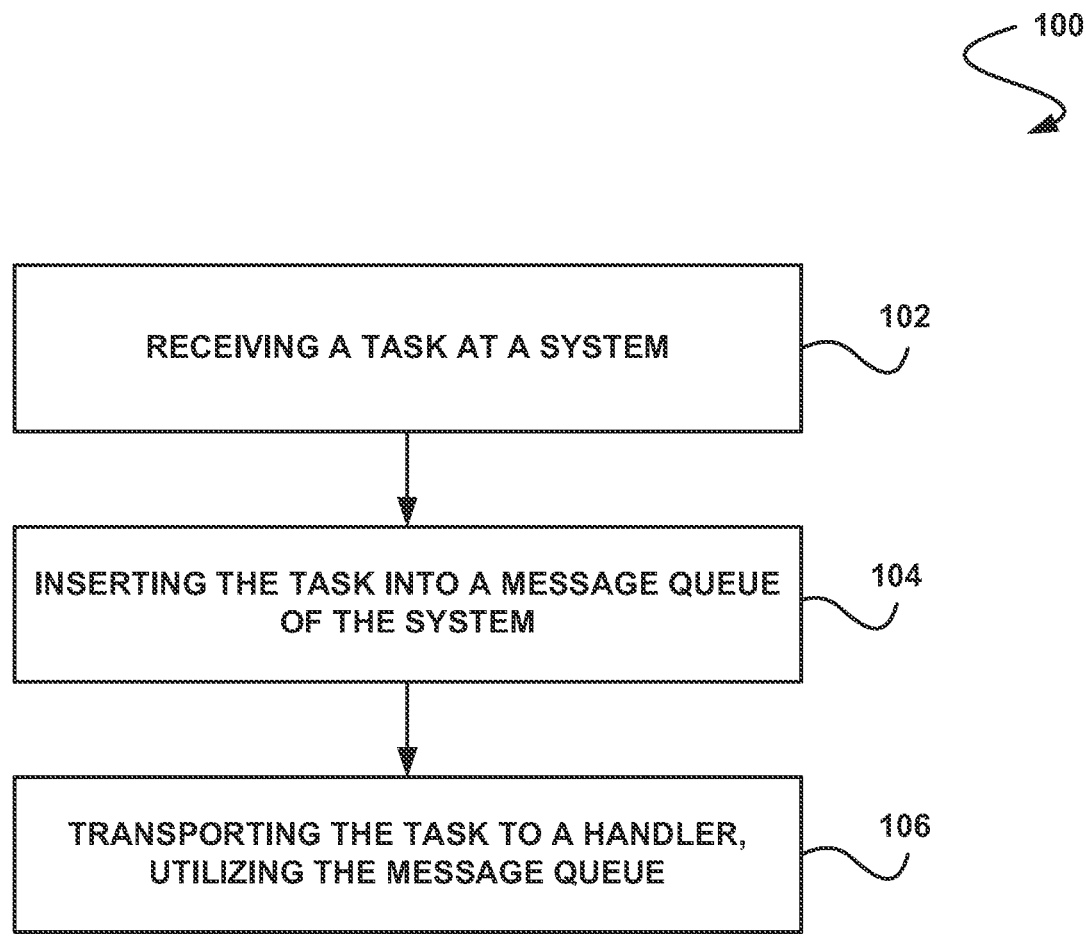
FIG. 1 illustrates a method for transporting a task to a handler, utilizing a queue, in accordance with one embodiment.

FIG. 1 illustrates a method 100 for transporting a task to a handler, utilizing a queue, in accordance with one embodiment. As shown in operation 102, a task is received at a system. In one embodiment, the task may include any action to be performed within the system (e.g., utilizing data within the system, utilizing resources within the system, etc.). In another embodiment, the task may include a request to perform the action within the system. For example, the task may include a request to install data within the system, a request to remove data within the system, a request to execute data within the system, etc.

Additionally, in one embodiment, the task may be received from a user of the system. For example, the task may be received from a client of the system, a customer of the system, an administrator of the system, etc. In another embodiment, the task may be received from a user associated with an organization of the system. In yet another embodiment, the task may be sent to the system utilizing an interface (e.g., a graphical user interface (GUI), etc.). In still another embodiment, the task may be initiated from within the system. For example, the task may include a request to clean up data within the system, release system disk space, etc. Further, in one embodiment, the system may include a client, a server, a multi-tenant on-demand database system, etc.

Further, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Further still, as shown in operation 104, the task is inserted into a message queue of the system. In one embodiment, the message queue may include any queue used for communicating messages within the system. For example, the message queue may be provided by a messaging framework of the system. In another embodiment, the task may be inserted into the message queue as a message. In yet another embodiment, the task may be inserted into the message queue in a declarative manner. For example, a description of the task may be inserted with the task into the message queue. In still another embodiment, an action to be performed on the task may also be inserted with the task into the message queue. In this way, the message queue may not be functionally limited to a predetermined type or types of tasks.

Also, in one embodiment, an identifier may be inserted into the queue with the task. For example, a signature may be included with the task when the task in inserted into the queue. In another example, the signature may be provided by the sender of the task. In yet another example, the signature may be automatically generated by the system. In still another example, the signature may be unique to the task. In another embodiment, a duplicate of the task may be identified within the queue. For example, the signature of the task may be compared with signatures of tasks already in the queue, and any matches may be returned (e.g., returned to the sender of the task, etc.). In this way, duplicate tasks may be avoided within the queue.

In addition, in one embodiment, the queue may be associated with a clustered database node. For example, one or more organizations within the system may be divided into one or more subgroups, and each subgroup may be associated with/ allocated to a different clustered database node (e.g., an Oracle© RAC node, etc.). In another example, all tasks from an organization that are inserted into the message queue may be stored on the clustered database node associated with that organization. In this way, disk logs may not need to be moved within nodes, thereby increasing performance. In another embodiment, the task may be inserted into the message queue by the entity that originally sent the task. In yet another embodiment, if a clustered database node fails, one or more additional nodes may take over the work of the failed node (e.g., by transferring tasks to different nodes, etc.).

Further, as shown in operation 106, the task is transported to a handler, utilizing the message queue. In one embodiment, the handler may include any entity capable of performing the task. In another embodiment, transporting the task to the handler may include removing the task from the message queue (e.g., dequeuing the task, etc.) and delivering the task to the handler for completion by the handler. In still another embodiment, the task may be processed at the handler. For example, the handler may perform one or more actions within the system specified by the task. In another embodiment, a plurality of handlers may exist within the system.

Further still, in one embodiment, the task may be returned to the queue if the handler fails to process the task. For example, the task may be dequeued from the queue and delivered to the handler, the handler may process the task (e.g., run the task utilizing one or more instructions associated with the task, etc.), and if the handler is successful in processing the task, then the actions of the handler and the dequeue of the task may be committed. However, if the handler is not successful in processing the task, then the task may be returned to the queue.

In another embodiment, the task may be cloned. For example, the handler may intermediately commit to the task by cloning the task and inserting it into the queue. If the task is successfully processed by the handler, the cloned task may be discarded from the queue. However, if the task is unsuccessfully processed by the handler, the cloned task may be retrieved from the queue and completed by the handler (e.g., from a point noted by the handler before the task failed, etc.).

Also, in one embodiment, the task may be suspended within the message queue. For example, if it is determined that the task is of a type that may cause other services within the system to be disrupted, the task may be suspended within the message queue in order to avoid any disruption. In another embodiment, the disrupted task may be later resumed. In yet another embodiment, the task may be inserted into the message queue by a user, and only that user may dequeue the message from the message queue. In still another embodiment, only the user that inserted the message into the queue may be able to view the message in the queue.

In addition, in one embodiment, the handler may not process the task if the task is from a particular organization of the system. For example, the handler may be instructed not to process tasks from a particular organization, to delay tasks from a particular organization, etc. In another embodiment, a time limit may be associated with the handler when it processes the task. For example, the handler can declare a time limit for their processing of the task. In this way, infinite processing loops may be avoided.

Furthermore, in one embodiment, the handler may wait until a predetermined number of tasks appear on the message queue before retrieving the predetermined number of tasks from the queue. In this way, the handler may work on the tasks in bulk. In another embodiment, a predetermined number of tasks in the message queue may be retrieved by the handler, and the handler may choose which tasks to work on from those that were retrieved. For example, the handler may choose which tasks to work on based on capacity, task size, etc. In yet another embodiment, the predetermined number of tasks that is retrieved may be cached, and any time a task from that predetermined number is performed by the handler, the cache may be updated.

Further still, in one embodiment, the handler may periodically enter a standby mode, based on one or more criteria. For example, the handler may retrieve a predetermined number of tasks from the message queue, review the tasks, and choose not to process any of the tasks. In response to this determination, the handler may enter a standby mode for a predetermined or indefinite amount of time. In another embodiment, the handler may exit standby mode in response to a time period elapsing, a new task arriving on the message queue, etc.

Also, in one embodiment, one or more alerts may be produced in response to one or more aspects of the message queue. For example, an alert may be produced when a number of attempts to insert the task into the message queue exceeds a predetermined number. In another example, an alert may be produced when a depth of the message queue exceeds a predetermined number. In yet another example, an alert may be produced when a task is in the message queue for a predetermined amount of time. Of course, however, an alert may be produced in response to any action or situation associated with the message queue. In another embodiment, the alert may include the sending of an email message, the sending of a short message service (SMS) message, the sending of a message to a pager, etc.

Additionally, in one embodiment, the task may be associated with one or more concurrency controls. For example, the task may be labeled in the message queue as being associated with a particular handler. In another embodiment, the task may be re-inserted into the message queue. Additionally, the task may have an identifier that is the same as the identifier of the task when it was first inserted into the message queue.

Figure 2:
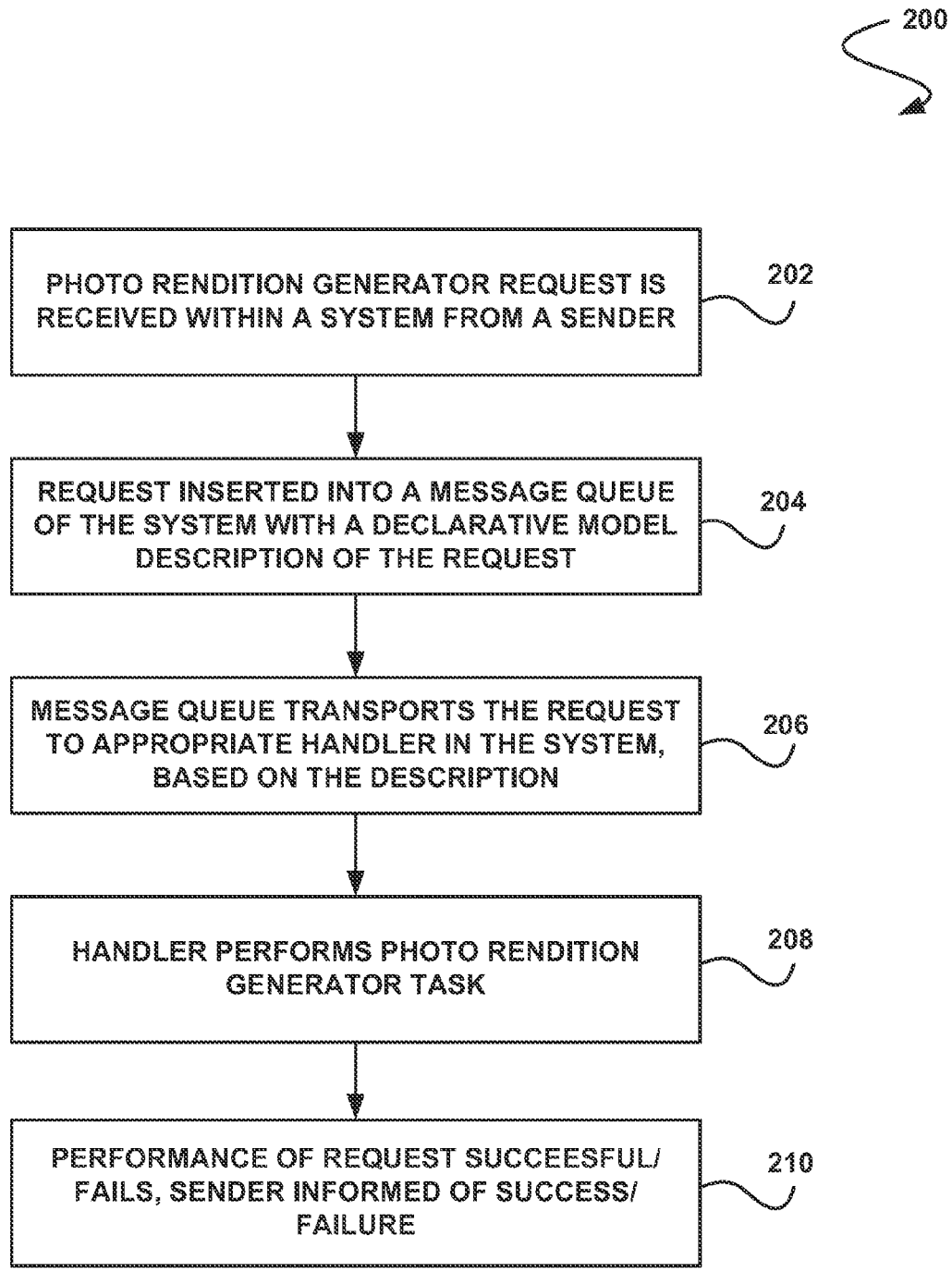
FIG. 2 illustrates method for transporting a photo rendition generator request within a system, in accordance with another embodiment.

FIG. 2 illustrates a method 200 for transporting a photo rendition generator request within a system, in accordance with another embodiment. As an option, the method 200 may be carried out in the context of the functionality of FIG. 1. Of course, however, the method 200 may be carried out in any desired environment. The aforementioned definitions may apply during the present description.

As shown in operation 202, a photo rendition generator request is received within a system from a sender. In one embodiment, the sender may include an application within the system. In another embodiment, the sender may include a user of the system. In yet another embodiment, the sender may include a background operation of the system. Additionally, as shown in operation 204, the request is inserted into a message queue of the system with a declarative model description of the request. For example, the request may be inserted into the message queue along with an description including an indication that the request is a photo rendition generator task, an indication of what the data of such task looks like, the actions to perform on such task, etc.

Further, as shown in operation 206, the message queue transports the request to an appropriate handler in the system, based on the description. For example, the message queue may transport the request to a handler capable of performing the task indicated by the declarative model description. Further still, as shown in operation 208, the handler performs the photo rendition generator task. Also, as shown in operation 210, the performance of the request is successful or fails, and the sender of the request is informed of the success or failure.

In this way, the system queue may dynamically transfer requests for a variety of tasks, utilizing the declarative model.

Further still, in one embodiment, there may be a layer of abstraction between users of the queue and the queue itself. In this way, the queue may be adjusted without any user inconvenience. In another embodiment, if the performance of the request fails at the handler, the sender may resend the request in response to this information. In yet another embodiment, the system queue may be pattern-adoptive. For example, if traffic within the message queue is uniform, all handlers on the system may get an equal share of task requests. However, if certain tasks are slower than others (e.g., take a longer time to complete, etc.), those jobs may be processed by a greater percentage of handlers.

In another embodiment, slower tasks may be labeled as tasks that should not utilize increased system capacity and may not be processed by a greater percentage of handlers. In this way, the message queue may be scalable (e.g., may be able to handle an increasing amount of tasks). Additionally, the message queue may be sensitive to system resources and fair with respect to task allocation.

Also, in one embodiment, increasing interconnect traffic may be avoided by creating one queue per clustered database node (e.g., an Oracle RAC node). For example, based on an organization-id of the session that enqueues a message, the message may be placed into an appropriate queue. Additionally, there may be one or more listeners per clustered database node that dequeue messages. In one embodiment, the message may be processed by a listener that has affinity to the organization that enqueued the message. Note that there may be multiple ways to model shared queues (e.g., as arrays, queues, linked lists, objects, etc.). In one embodiment, single consumer queues may be used. In one implementation, the payload message type may be used to distinguish different consumers of a single shared queue.

In another embodiment, when it is necessary to dequeue specific message types only, conditional dequeues for messages of the specific type may be used. In one implementation, shared consumer queues may be used in such a way that each message type is mapped to a consumer. In this way, the dequeue for specific types may listen (e.g., dbms_aq.listen) for the appropriate consumers and then, upon detecting a consumer, dequeuing the message associated with the consumer name.

In one embodiment, setup for a shared consumer queue may include: no default subscribers setup on the queue itself; each enqueue may supply a consumer name; dequeue may have a set of consumer names; message intended to any of those consumers may be dequeued and processed.

Additionally, in one embodiment, a queue interface including a message queue may define features used by typical queue consumers. Further, an administrator queue interface may define the features used by administrator consumers. In another embodiment, a message handler interface may be used to define handling of the message upon dequeue. Accordingly, one message handler may be defined for each message type. With respect to dequeue processing, a queue processor master class may manage queue processor slave instances. It may also have a map of type message to apply to message handler implementations. Further, a queue processor may be capacity aware, and it may enforce of max limits for concurrent processing on per type basis.

In one exemplary embodiment, with respect to transactional behavior (e.g., enqueue, dequeue, retry, etc.), enqueue may have no special notion of transactions, and may work within the boundary of outer transaction. Additionally, in another embodiment, during a dequeue action, a queue worker may commit if the message handler completes successfully. If the message handler throws an exception, then the queue worker may rollback the transaction. This may make the message a candidate for retry. In yet another embodiment, retries may have a delay of 10 minutes, but this may be altered.

In one embodiment, a message may be available for retry until it reaches a maximum retry count. At that point, it may be placed on the exception queue and may not be available for dequeue any more. In another exemplary embodiment, placing the message on the exception queue may be automatically performed. However, when a message runs out of retry limits, custom logic may be inserted. Additionally, in another embodiment, a queue processor slave may hold on to a connection pool (e.g., with a specific clustered database node as an end point, etc.). In still another embodiment, it may use a first partition from this pool to set a database context partition specifier prior to dequeue. In yet another embodiment, post dequeue, it may set the organization specific Information on the database context. In still another embodiment, the connection swapper rules may be relaxed to allow setting a new organization based partition specifier as long as the original partition goes to the same clustered database node.

Further, in one exemplary embodiment, message handlers may be given a connection that has been setup to the correct organization. In another embodiment, message handlers may not be permitted to obtain a new connection from database context or commit on the supplied connection. Post message handler, the connection may be released and partition is cleared on the database context. In yet another embodiment, there may be two types of queue processing logic. One may be the basic approach that does not understand the message type specific capacity. Another one may be a capacity aware queue processor.

In another exemplary embodiment, an instance wide ability to suspend and resume message types may be supported. As an option, suspend may insert a row in a core suspended queue type table. It may not do anything to the messages. In another embodiment, dequeue may skip suspended types by not considering the consumer names of suspended types during dequeue. In yet another embodiment, upon resuming a specific type, dequeue may start using that type's consumer during the dequeue.

Further still, in one exemplary embodiment, there may or may not be organization specific ways to suspend resume types. In another embodiment, suspended types may be cached at the app server level. In yet another embodiment, the cache may be refreshed on a need by basis if the time since last refresh is more than a predetermined period (e.g., a minute, etc.). Also, in still another embodiment, a core suspended queue type may not be partitioned. It may always be accessed from the same clustered database node.

With respect to testing scenarios, in one exemplary embodiment, the queue framework may perform functionality testing. A dedicated test only queue may be used. In another embodiment, a lock may be used to obtain exclusive access to the queue. This may make sure that the results on the queue tests are consistent. In yet another embodiment, the queue may be cleared before and after the test. In still another embodiment, asynchronous functionality testing may be performed using ftests. This may be used for synchronous testing. Also, in one embodiment, synchronous functionality processes may be performed using manual testing. This may use a function that makes sure that multiple testers do not step over each other.

In one exemplary embodiment, with respect to optional failover behavior, when a failover is detected (this may be done through checking for pool partitions being null or empty), the thread that detects the failover may get an alternate pool, and may drain the messages in the failed node's queue to other physical queues based on the organization identifier of the message. In another embodiment, this action may repeat once in every 10 minutes or so, so that any of the messages that are left on the queue to due to retry delay reasons may also get moved over. In yet another embodiment, upon performing a re-enqueue for failover, a retry count on the message may be set back to zero. In still another embodiment, when the node comes back up, the partition to clustered database node maps may be re-updated to reflect the original state, and the messages that now find themselves in the wrong node may be moved as and when they are encountered into the correct node. This may also reset the retry count.

In another exemplary embodiment, various embodiments may be provided by the infrastructure described hereinabove. For example, feature parity to existing queues at least with the features that are being used may be provided. In another example, there may be no downtime for high water mark issues or other rebuild needs. In yet another example, there may also be support for high volume, low latency, etc. In another embodiment, interconnect traffic may be reduced. In still another embodiment, the infrastructure may be monitorable. There may also be support for developer owned "private" queues for testing purposes. In another embodiment, the system may also be relatively easy and lightweight for a dev to add a basic queue system (e.g., no datamodel changes may be required).

In another exemplary embodiment, customers or developers may be given an interface to view (and retry, cancel, etc.) messages. In another embodiment, slow consumers/"stuck" messages may be dealt with so they don't block the rest of the queue. In yet another embodiment, retries in general may be addressed, as well as non-guaranteed delivery (e.g., using an ack/noack response, etc.). Expiring messages may be addressed, as well as sending emails on success or failure (within the job queue, etc.), locking objects (within the job queue, etc.), etc. Further, in another embodiment, organization level message type suspension may be addressed. In yet another embodiment, there may also be support for committed message handling, and support for processing content types messages only on content servers. Also, there may also be a way to interrupt long running handlers, allow over capacity if other types are not available, support elastic behavior in queue processor capacity, prevent enqueues into a backed up queue (e.g., on a per message type or on a per message type-organization combination, etc.), bulk dequeue, move additional consumers from job queues, etc.

In another exemplary embodiment, message handlers may be allowed to declare themselves as expecting committed messages. For example, when the committed message handlers are about to be called, the framework may clone the original message and enqueue it back on to the queue with a delay. In another embodiment, the framework may also remember an ID of the clone. In yet another embodiment, if the handler successfully completes, then the clone may be removed. The removal of message ID from the queue may work independently of the delay on the message itself. In still another embodiment, if the handler fails, the clone may not be removed from the queue and the message may be retried after the delay time elapses. Handlers may be allowed to provide the enqueue delay and maximum number of retries.

Additionally, in one exemplary embodiment, each message type may declare what cluster name it is going to be processed in. For example, there may be a new method on the message handler interface to return the cluster name. In another embodiment, if the cluster name of the message type does not match that of the cluster, then the cluster may ignore such message types. In yet another embodiment, the message handler may have a new signature to indicate the fact that the handlers are interested in a max limit for processing time and what that time is.

In still another embodiment, the message handler may also introduce a new method associated with message handling over a time limit. In one embodiment, for message types that require this method, prior to calling the handler, a timer task may be scheduled which may call the method on the handler object after a max time has elapsed. In another embodiment, after the handle message function exits, the task may be cancelled. Due to a race condition here, the method may get called after the handle message function has exited.

Further, in one exemplary embodiment, when a message type is suspended for enqueue, the message framework may throw an exception if an attempt is made to enqueue such a message. In another embodiment, a bulk dequeue may be exposed in the message framework. For example, each message type may specify if it needs bulk behavior or not and what maximum size should be used for bulk dequeues. In yet another embodiment, the message framework may perform a bulk dequeue for message types that require that behavior. For example, instead of returning one message, the message framework may return up to a predetermined number of messages of the same type. Each message in the set may belong to different orgs. In another embodiment, there may be no organization level grouping within the set or there may be no way to request messages from the single organization. In another embodiment, when the message handler is called, it may be supplied all messages in a single call. In still another embodiment, if the handler fails, all the message dequeues may be rolled back.

In yet another exemplary embodiment, existing job queue process consumers may be iterated over and may be moved over to the message framework. In still another embodiment, handlers may choose what they want to process instead of being given what is at the front of the queue. In another embodiment, a clone may be deferred to when original is in process.

Further still, in one exemplary embodiment, 'peek and pick' functionality may be enabled for message handlers. For example, a new method may be added on the message handler to retrieve peek behavior. This may return an instance of an interface peek behavior. In another example, a return value greater than zero from the get peek size method on this interface may indicate to the framework that the message type requires peeking. In another embodiment, upon returning a hit on a listen call for such message types, the framework may do the following: dequeue up to a predetermined number of messages using; call a new method on the peek behavior interface and pass the above set of messages; etc. In another embodiment, the return value of the above method may indicate what message or messages the handler wants to process.

In another exemplary embodiment, if the return value is not empty, then the framework may dequeue the selected message or messages using the ID. In another embodiment, if the framework found at least one message, then they may call a handle message function. In still another embodiment, if no message could be found, the dequeue thread may return to the worker pool. In yet another embodiment, if the return value is empty, then the framework may place the message type and the clustered database node combination into standby mode for an amount of time.

Also, in one exemplary embodiment, the message type-clustered database node combination may be placed in standby mode. For example, the message types consumer may not appear on the listen list built for dequeue. In another example, the combination may start adding it to the listen list after that combination has been woken up and brought back to active state. In another embodiment, the message type-clustered database node may wake up based on time (e.g., after N seconds it may flip back to active state, etc.). The time may be determined by the handler. In another embodiment, it may also be woken up early by following events: a new message being enqueued for that message type-clustered database node combination; completion of a currently miming handle message method for that message type-clustered database node combination; a call initiated outside to wake-up the combination from an external source; etc.

In another exemplary embodiment, messaging consumers may declare themselves as needing duplicate detection. When they do, they may either supply their own signature for the message or have the message framework generate one by looking at the contents of the message. This signature may be stored in the system for the duration of the message's life in the system (e.g., roughly the time after enqueue commits to just before dequeue commits, etc.). In one embodiment, the distributed problem may be solved by using the database as the single source of truth. For example, upon enqueue, if there exists a row in the database with the same signature, the enqueue transaction may signal "duplicate" and offer the enqueueing thread a chance to roll back the enqueue.

In another exemplary embodiment, there may be two variants in the determination of the end of life of the signature. One may be upon the first dequeue, even without the dequeue committing. The second may be tied to commit of the dequeue transaction. In yet another embodiment, the framework may support both of these variants using a declarative mechanism.

Additionally, in one exemplary embodiment, a queue depth alert may be enabled. For example, this alert may happen when a total number of messages in any single physical queue goes over a predetermined number (e.g., 2000, etc.). In another embodiment, a queue alert may be enabled which may happen when there are messages that are a certain age in the queue (e.g., at least 20 minutes or older in the queue, etc.).

In another exemplary embodiment, generic concurrency locking may be performed. For example, the message queue framework may have supported dequeue time organization concurrency restrictions for several releases. In another embodiment, for message types that need to enforce organization concurrency, the framework may obtain a row in a system database table for the duration of message processing. In yet another embodiment, the per organization limits may be more than one.

Further, in one exemplary embodiment, after obtaining a concurrency lock, the framework may check and see if the message type that is being dequeued uses bulk dequeue. If so, it may fetch the concurrency semaphore for all messages that are currently in the peek set and may add any messages with identical (organization ID, semaphore, etc.) combinations as the message on which a lock was obtained, to the candidate for dequeue list. In another embodiment, this list may be bounded by a maximum size specified by bulk dequeue consumers.

System Overview

Figure 3:
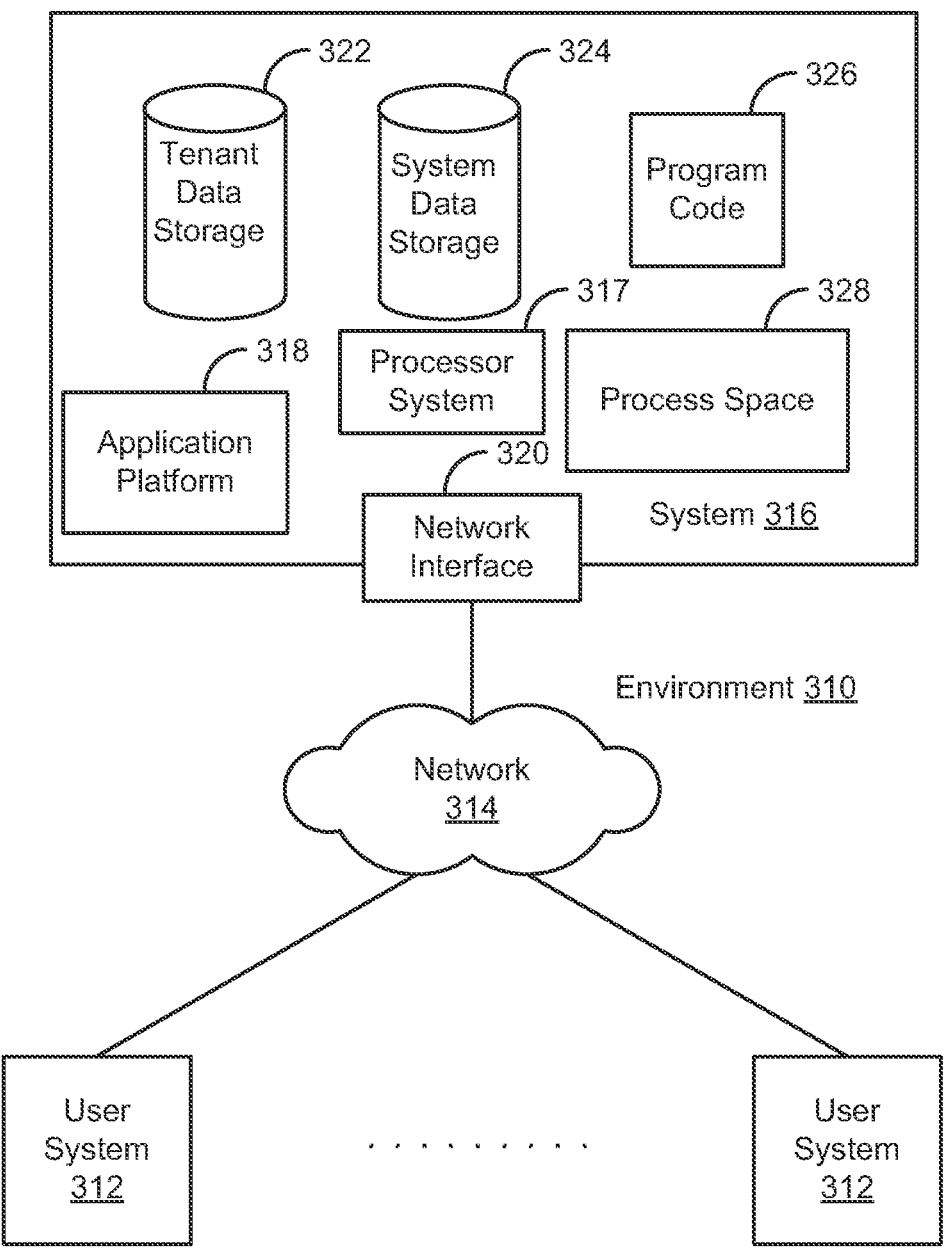
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which Is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to ran, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson Is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network Interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an MTS, where more than one is present) and ail of their components might be operator configurable using application (s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
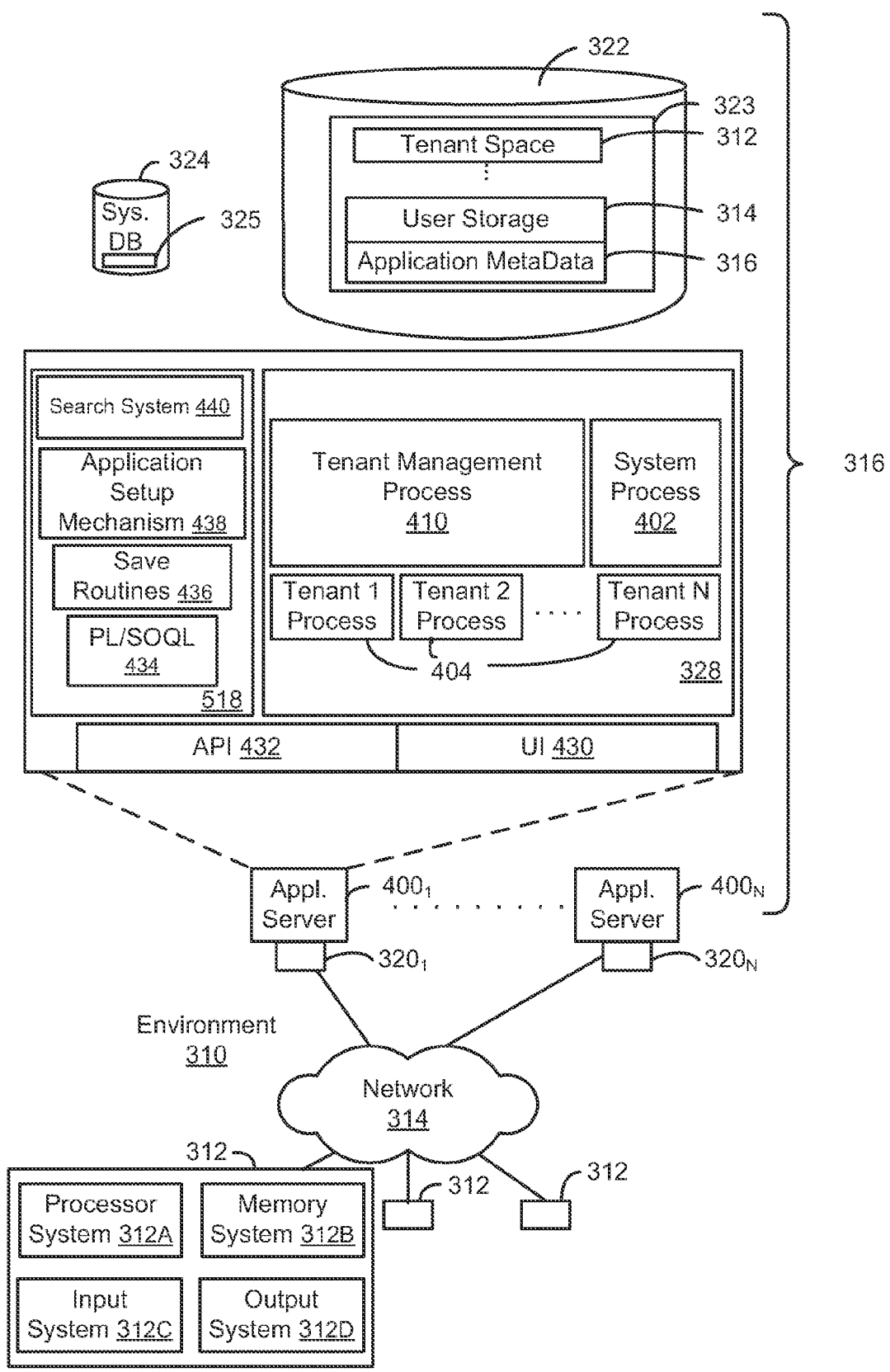
FIG. 4 illustrates a block diagram of an embodiment of elements of FIG. 3 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may Include tenant data storage 322, tenant data 323, system data storage 324, system data 325, User Interface (UI) 430, Application Program Interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant might be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber making the invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of, and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 312 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product, comprising a non-transitory computer usable medium having a computer readable program code embodied therein, the computer readable program code adapted to be executed to cause a computer to implement a method for transporting a task to a handler, utilizing a queue, the method comprising:
receiving a task at a system from a sender;
identifying a signature provided by the sender;
comparing the signature provided by the sender to signatures within a message queue of the system;
returning the task to the sender when the signature provided by the sender matches a signature within the message queue of the system;
inserting the task, the signature, and an identifier into the message queue of the system when the signature provided by the sender does not match any of the signatures within the message queue of the system, and transporting the task to a handler, including removing the task from the message queue and delivering the task to the handler for completion by the handler, where the handler intermediately commits to the task by cloning the task and inserting it into the message queue, and where if the task is successfully processed by the handler, the cloned task is discarded from the message queue.

2. The computer program product of claim 1, wherein the task includes a request to perform an action within the system.

3. The computer program product of claim 1, wherein the task is received from a user of the system.

4. The computer program product of claim 1, wherein the task is initiated from within the system.

5. The computer program product of claim 1, wherein a description of the task is inserted with the task into the message queue when the signature provided by the sender does not match any of the signatures within the message queue of the system.

6. The computer program product of claim 1, wherein an action to be performed on the task is inserted with the task into the message queue when the signature provided by the sender does not match any of the signatures within the message queue of the system.

7. The computer program product of claim 1, wherein the message queue is associated with a clustered database node.

8. The computer program product of claim 7, wherein one or more organizations within the system are divided into one or more subgroups, and each subgroup is associated with a different clustered database node.

9. The computer program product of claim 8, wherein all tasks from an organization that are inserted into the message queue are stored on the clustered database node associated with the organization.

10. The computer program product of claim 7, wherein if the clustered database node fails, one or more additional nodes may take over for the failed node.

11. The computer program product of claim 1, wherein the task is returned to the message queue if the handler fails to process the task.

12. The computer program product of claim 1, wherein if the task is unsuccessfully processed by the handler, the cloned task is retrieved from the queue and completed by the handler from a point noted by the handler before the task failed.

13. The computer program product of claim 1, wherein if it is determined that the task is of a type that causes other services within the system to be disrupted, the task is suspended within the message queue.

14. The computer program product of claim 1, wherein a time limit is associated with the handler when it processes the task.

15. The computer program product of claim 1, wherein only the sender is allowed to view messages within the message queue and dequeue messages from the message queue.

16. The computer program product of claim 1, wherein the handler waits until a predetermined number of tasks appear on the message queue before retrieving the predetermined number of tasks from the message queue.

17. The computer program product of claim 1, further comprising identifying a number of times the task has been received from the sender, and producing an alert when the number of times exceeds a predetermined number.

18. The computer program product of claim 1, further comprising labeling the task in the message queue as being associated with a particular handler and re-inserting the task into the message queue, where the re-inserted task has an identifier that matches an identifier of the task when it was first inserted into the message queue.

19. A method, comprising:
receiving a task at a system from a sender;
identifying a signature provided by the sender;
comparing the signature provided by the sender to signatures within a message queue of the system;
returning the task to the sender when the signature provided by the sender matches a signature within the message queue of the system;
inserting the task, the signature, and an identifier into the message queue of the system when the signature provided by the sender does not match any of the signatures within the message queue of the system, and transporting the task to a handler, including removing the task from the message queue and delivering the task to the handler for completion by the handler, where the handler intermediately commits to the task by cloning the task and inserting it into the message queue, and where if the task is successfully processed by the handler, the cloned task is discarded from the message queue.

20. An apparatus, comprising:
a processor for:
receiving a task at a system from a sender;
identifying a signature provided by the sender;
comparing the signature provided by the sender to signatures within a message queue of the system;
returning the task to the sender when the signature provided by the sender matches a signature within the message queue of the system;
inserting the task, the signature, and an identifier into the message queue of the system when the signature provided by the sender does not match any of the signatures within the message queue of the system, and transporting the task to a handler, including removing the task from the message queue and delivering the task to the handler for completion by the handler, where the handler intermediately commits to the task by cloning the task and inserting it into the message queue, and where if the task is successfully processed by the handler, the cloned task is discarded from the message queue.

21. A computer program product, comprising a non-transitory computer usable medium storing computer instructions capable of implementing a method for transporting a task to a handler, utilizing a queue, the method comprising:

receiving a task at a system from a sender;

identifying a signature provided by the sender;

comparing the signature provided by the sender to signatures within a message queue of the system;

returning the task to the sender when the signature provided by the sender matches a signature within the message queue of the system;

inserting the task, the signature, and a description of the task into the message queue of the system when the signature provided by the sender does not match any of the signatures within the message queue of the system, and transporting the task to a handler, including removing the task from the message queue and delivering the task to the handler for completion by the handler, where the handler intermediately commits to the task by cloning the task and inserting it into the message queue, and where if the task is successfully processed by the handler, the cloned task is discarded from the message queue.

22. A computer program product, comprising a non-transitory computer usable medium storing computer instructions capable of implementing a method for transporting a task to a handler, utilizing a queue, the method comprising:

receiving a task at a system from a sender;

identifying a signature provided by the sender;

comparing the signature provided by the sender to signatures within a message queue of the system;

returning the task to the sender when the signature provided by the sender matches a signature within the message queue of the system;

inserting the task, the signature, and an action to be performed on the task into the message queue of the system when the signature provided by the sender does not match any of the signatures within the message queue of the system, and transporting the task to a handler, including removing the task from the message queue and delivering the task to the handler for completion by the handler, where the handler intermediately commits to the task by cloning the task and inserting it into the message queue, and where if the task is successfully processed by the handler, the cloned task is discarded from the message queue.

* * * * *